United States Patent

[11] 3,615,442

[72] Inventors Frank T. Geris
Naperville, Ill.;
John W. Krueger, Cottage Grove, Wis.

[21] Appl. No. 715,094
[22] Filed Mar. 21, 1968
[45] Patented Oct. 26, 1971
[73] Assignee Wisconsin Alumni Research Foundation
Madison, Wis.
Continuation-in-part of application Ser. No. 372,715, June 4, 1964, now abandoned, Continuation-in-part of application Ser. No. 421,070, Dec. 24, 1964, now abandoned.

[54] METAL PRINTING PLATE AND METHOD FOR PREPARATION OF SAME
37 Claims, 5 Drawing Figs.

[52] U.S. Cl. .......... 96/33, 96/36.3, 96/75, 96/86, 117/34, 204/143, 204/17, 101/459
[51] Int. Cl. .......... G03f 7/02, G03c 5/00, G03c 1/71
[50] Field of Search .......... 117/34; 96/75, 86

[56] References Cited

UNITED STATES PATENTS

| | | | |
|---|---|---|---|
| 3,061,435 | 10/1962 | Tomanek et al. | 96/75 |
| 3,118,765 | 1/1964 | Leonard et al. | 96/75 X |
| 3,168,401 | 2/1965 | Sus | 96/86 X |
| 3,188,211 | 6/1965 | Kocsuter | 96/36 |
| 3,471,289 | 10/1969 | Herrick | 96/75 X |
| 3,287,128 | 11/1966 | Lugasch | 96/75 X |

*Primary Examiner*—David Klein
*Attorney*—McDougall, Hersh, Scott & Ladd

ABSTRACT: A metal printing plate and method for preparation of same wherein the metal is selected from the group consisting of copper, zinc, aluminum, iron, brass, silver, tin, lead, magnesium, stainless steel, chromium, manganese, nickel and alloys thereof and in which the metal is presensitized with a light sensitive diazo material which is applied to the metal surface of the plate in a manner to provide for direct contact with the metal for reaction to form a stabilized light sensitive diazotized coating which permits imaging by photo techniques to produce an imaged plate and which preferably is etched by an electrical or chemical etch after exposure to produce a deep etched lithographic plate or gravure plate from which many copies can be produced and in which stabilization is achieved by mechanically working, abrading or immersing the plate surface with the light sensitive diazo resin solution and which includes treatment for controlling the degree of polymerization of the light sensitive diazo resin in the coating for control of subsequent image development.

INVENTORS
Frank T. Geris
John W. Krueger
by McDougall, Hersh, Scott and Ladd Att'ys

METAL PRINTING PLATE AND METHOD FOR PREPARATION OF SAME

This is a continuation-in-part of our copending application Ser. No. 372,715, filed June 4, 1964 and entitled "Method of applying a diazo compound to copper or silver bases to form presensitized printing plates," and application Ser. No. 421,070, filed Dec. 24, 1964, and entitled "Method for preparing imaged metal photolithographic plates ready for Printing," both of which are now abandoned.

This invention relates to the preparation of printing plates and to the method of use in the processing of the plates for the production of printed copies therefrom.

Essentially, all methods of printing may be divided into four general categories. One is generally referred to as gravure (or intagilo), and involves providing a plurality of recesses (or "-wells") in the otherwise smooth surface of a plate or cylinder of metal, usually copper. The recesses are filled with ink by applying ink to the entire surface and removing it from the smooth unrecessed surface areas by passing the surfaces under a flexible doctor blade which is in contact with the surface and removes substantially all ink not contained in the recesses. To print an image, paper is then pressed against the surface; its fibers are pressed into the recesses and remove ink from the recesses. Photogravure is the branch of gravure printing in which photographic methods are used to provide an image comprising differentiated areas of etchant resistant material on the surface of a plate or cylinder so that the etchant or etching media or process will produce a suitable pattern of recesses to reproduce a desired image. In all photogravure work, the recesses are not interconnected. In most photogravure, the recesses do not vary substantially in area but vary only in depth and the various tones of the printed image are determined entirely by depth of the recesses, and consequently the amount of ink absorbed or transferred out of the recesses in the various corresponding areas.

A second printing process is usually referred to as letterpress and may be taken as including all processes in which lands and recesses are provided on a surface and ink is provided only on the lands and transferred only from the lands to the surface which is to receive the printed image. It includes processes in which type is set and then inked and printed and processes in which a matt is made from the type and used to cast a stereo, the lands or raised surfaces of the stereo then being inked and printed. Photoengraving may be considered a branch of the letterpress category; it normally involves use of photographic methods and provides plates suitable for printing images of pictures, designs and the like. To produce plates suitable for reproducing pictures, designs and the like, photographic methods are usually used to provide a differentially etchable surface (differentiation usually being provided by action of light and then developer on a photosensitized layer of gelatin, polyvinyl alcohol or the like) on a metal plate or cylinder, which is then etched to remove metal from areas which are not to be printed. Thus the areas and shapes of the lands are important. Depths of recesses between lands are important only to the extent needed only to be sure they are not filled with ink during inking and to be sure that paper is not pressed against the bottom of a recessed area while taking an impression, that is, during the step of pressing the plate or cylinder and a sheet of paper together to transfer ink from the former to the latter.

The third general category includes those methods in which a surface is differentiated into oleophilic (ink receptive) hydrophobic areas and into hydrophilic (water receptive, ink rejecting) areas. Printing is accomplished by transfer of ink from the oleophilic areas to paper or the like.

The fourth category includes silk-screening and other methods involving transfer of printing material through a screen or stencil.

This invention relates to plates formed of various metals having a coating of a light sensitive diazo compound to provide a plate which can be used as a presensitized offset or photolithographic plate, or which can be used to produce an etched plate of the character identified as a deep etched lithographic plate, a gravure plate which includes photogravure and graded gravure printing plates.

Photogravure plates usually carry a pattern in the fröm of a reticulated screen, the lines of which vary in area, but may have a pattern in the form of dots or spots which, if present, vary only in area but not in depth unlike graded gravure. A graded gravure image is regarded by those in the art as being of substantially higher quality than images obtained by photoengraving and lithographic processes and are most useful to produce handsome images even on relatively poor grades of paper. Graded gravure plates have been correspondingly difficult to make and have required greater craftsmanship, more time and effort in manufacture and have been of considerably greater cost.

In accordance with the present invention, a graded gravure plate of the highest quality is provided by a method which can be carried out with less craftsmanship, with less effort and with less time that has heretofore been possible. In accordance with the method of this invention a graded gravure plate and also a photogravure plate can be provided at substantially no greater expense than has heretofore been required for any photoengraved and lithographic plates and the costs of producing photoengraved plates can be greatly reduced.

It has not heretofore been possible to provide presensitized plates for producing photogravure, especially graded gravure, or photoengraved images. Consequently each user of a photogravure or graded gravure process has had to prepare his own plates, starting with bare unsensitized metal, usually copper, and consequently each user has been required to maintain a staff of highly skilled and extremely well paid craftsmen. The use of the graded gravure process has thus been severely limited and it has been relatively difficult and expensive to provide graded gravure images. Likewise, users of other photoengraving processes have generally sensitized their own plates and maintained comparable staffs.

In accordance with the present invention, presensitized plates are provided, which are preferable for use in the photogravure and especially the graded gravure processes to those prepared in accordance with the modes of the prior art. Manufacture and use of such presensitized plates can make it possible for the photogravure and especially the graded gravure process to be used much more widely and at much less expense. For example, the instant invention creates the possibility that in the future the graded gravure process may be used on a scale as wide and at an expense as low as is now the case with photoengraving or perhaps even lithography The possibility may be envisioned that by reason of this invention, the use of the graded gravure process may supplant a substantial portion of the use of the photoengraving or lithographic processes.

Heretofore in order to prepare a photogravure or graded gravure plate it has been necessary to utilize either a layer of gelatin coated on a paper backing sheet or a layer of other presensitized photosensitive material, usually gelatinous in nature, coated on a backing sheet of material such as paper or synthetic resin film, The latter being any one of several proprietary products. In utilizing a layer of gelatin coated on paper, it has been necessary to first condition the gelatin coated paper at a certain humidity and to then make it photosensitive by immersing it in a solution of potassium or ammonium dichromate in water. Several alternative processes are used in photoengraving to provide on a surface a layer of photosensitive material, the four principal such materials being: dichromated albumin, dichromated glue, dichromated polyvinyl alcohol and cold enamel which comprises shellac. The next step required heretofore has been to expose the gelatin or other photosensitive layer to light through a negative (in photoengraving) or a positive transparency (in photogravure and graded gravure) in which the degree of transparency is more or less directly proportional to the lightness or darkness of corresponding portions desired in a finished printed image, in order to provide a negative "image" in the gelatin layer. The gelatin is insolubilized in proportion to the intensity of light reaching it by reason of conversion (as a result of the exposure to light) of the dichromate to chromium oxide which tans the gelatin and accomplishes its insolubilization.

In photogravure, including graded gravure, the gelatin in the photosensitive layer is then adhered to a clean copper surface. This step is difficult and requires great skill. There is considerable tendency for the wet, weak gelatin layer to be squeezed out of position or to slide out of position as it is rolled or pressed into place, with resultant deleterious effect on image quality and register which may be obtained with the resulting plate.

After adhering the gelatin or other photosensitive layer to the surface, the backing layer is then stripped from the plate or cylinder. If paper backing is used, it is necessary to first soften the backing sheet with water in order to make possible its release.

The copper surface of the plate or cylinder is then etched by applying ferric chloride, either by dipping or by other and various coating methods. Perhaps the greatest skill in the entire gravure industry is required in this step. It is almost entirely a matter or art rather than of science in that it is necessary to apply, successively, solutions of ferric chloride at various concentrations and often to apply these selectively to different portions of the plate or cylinder in order to get the desired results. The ferric chloride penetrates or "goes through" the relatively insolubilized portions of the gelatin and etches wells or recesses, the depth of which is a function of the rate of penetration of the etchant through the gelatin, the concentration of the etchant, and the temperature of the etchant. When etching is completed, the gelatin or other photosensitive layer is removed from the copper surface, the plate or cylinder is then inked, excess ink is removed with a knife, and an image is printed by impressing the plate or cylinder against a sheet of paper linoleum, artificial wood or other material.

It is typical of the photogravure and photoengraving processes that the process of etching the plate or cylinder normally produces wells or recesses having undercut walls.

In photogravure, those recesses which are made deepest in order to contain the most ink to provide the darkest portions of the printed image which is the end result are commonly most seriously undercut and great skill on the part of the etcher is required in order to prevent the undercutting from being too severe while at the same time causing the deepest wells or pits to have sufficient depth so that they will hold enough ink to produce the necessary dark tones.

It has heretofore been proposed to apply a gelatinous layer directly to the copper surface of a plate or cylinder and to then sensitize it or to apply a layer of photosensitive gelatinous material directly to the copper plate. These proposals have been made for the purpose of eliminating the steps which involve use of a sheet of backing material but, although such technique has been used in photoengraving, it has not been possible to utilize such a process for making photogravure and especially graded gravure plates on a satisfactory basis.

Important difficulties are encountered with the aforementioned photogravure processes of the prior art. For example, deterioration of dichromate sensitized material begins immediately after it is made. Complete deterioration may take place in as short a time as a few minutes in the summer or 24 hours in the winter. The rate of deterioration is never the same, being a complex function of the ambient temperature, humidity and light intensity to which the solution is subjected. All of the photosensitive layers which it has been possible to utilize heretofore for the preparation of photogravure plates vary in both photosensitivity and sensitivity to the etchant in response to changes in both humidity and temperature. Therefore, it has not been possible to produce duplicate plates or cylinders from the same transparent positive on a repetitive basis other than to the extent that plates or cylinders could be made nearly identical through application of great skill and knowledge of the art applied by a human master of the etching art. In other words, the ability to provide similar or nearly identical etched photogravure and especially graded gravure plates or cylinders has corresponded in many respects to the ability to provide a duplicate of an oil painting by copying the same picture with oil paint.

It is a still further object of this invention to produce and to provide a method for producing a presensitized gravure printing plate which is not limited to plates formed or copper or of a copper base but which may in addition be formed with a base of such metals as zinc, aluminum, iron, brass, silver, tin, lead, magnesium, chromium, manganese, nickel and alloys thereof or laminations of such metal on any suitable base.

These and other objects and advantages of this invention will hereinafter appear and for purposes of illustration, but not of limitation, an embodiment of the invention is shown in the accompanying drawing in which FIG. 1 is a perspective view partially in section of a diazo sensitized metal printing plate prepared in accordance with the practice of this invention;

Figure 1:
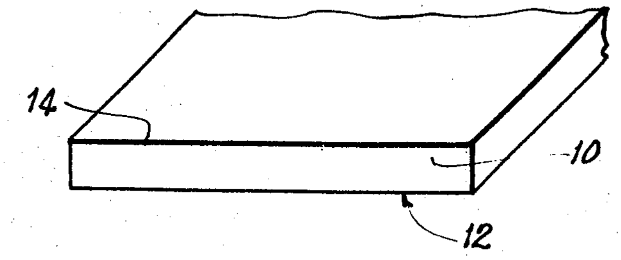
Figure 2:
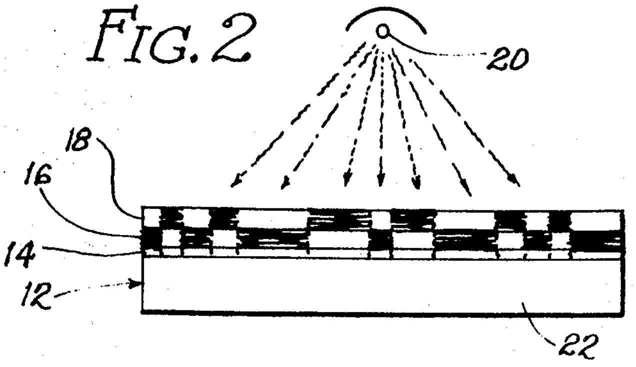
FIG. 2 is a sectional elevational view showing the arrangement of elements for exposure of the diazo sensitized plate of FIG. 1.
Figure 3:
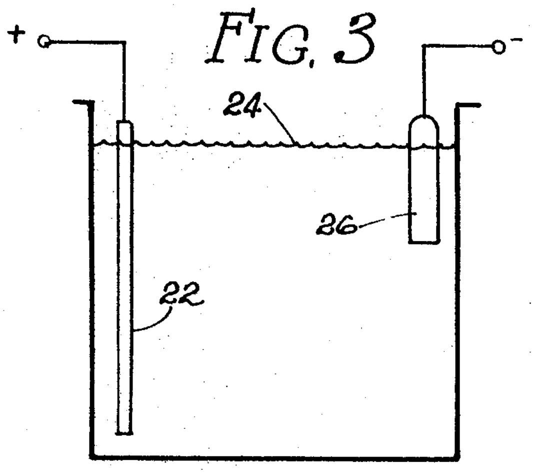
FIG. 3 is a schematic view of the arrangement of elements for electrical etch of the exposed plate of FIG. 2.
Figure 4:
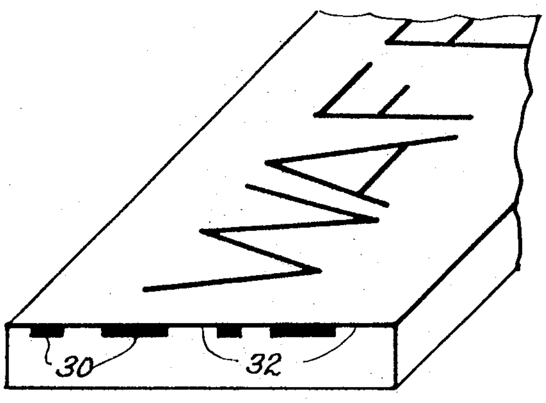
FIG. 4 is a perspective view partially in section of an etched plate produced by the elements in FIG. 3.

One of the important problems in the preparation of a metal printing plate presensitized with a light-sensitive diazo compound is to fabricate the metal plate with a coating of diazo compound which will not deteriorate or decompose but which will instead remain light sensitive over extended periods of time for good shelf life and still retain its properties for etching after exposure to produce the desired deep etched or photoengraved image or the desired photolithographic image, depending upon the composition of the metal, the composition and treatment of the coatings and the methods of image development as will hereinafter be described.

For example, in the preparation of a presensitized photolithographic plate of aluminum, it has been necessary to stabilize the lithographic surface against decomposition of the light-sensitive diazo resin forming compound, as by treatment of the surface to provide a silicated lithographic surface, as described in the Jewett et al. Pat. No. 2,714,066, or by pretreatment of the surface with a polyacrylic acid polymer, as described in the Dowdall Pat. No. 3,136,636. The stabilized surface is then provided with a coating of a water soluble light-sensitive resin forming diazo compound which, upon exposure, is reduced in the exposed areas to a resinous, oleophilic, ink receptive compound which represents the ink receptive, water repellent image, while the diazo compound in the unexposed areas is removed by an aqueous wash, preferably by the desensitizing solution, to expose the underlying water receptive, lithographic surface which represents the nonimaged portions of the plate.

The ink receptive, water repellent imaging material forms on the surface of the plate in the exposed portions while the unexposed portions remain water receptive and hydrophilic. The imaged plate can be mounted on a conventional lithographic press for the production of multiple copies by conventional lithographic duplicating technique. The number of copies that can be produced from plates of the type described is somewhat limited by the wear of the exposed image on the surface of the plate. As a result, the imaged plate cannot be employed as a printing plate in the production of long run lithography.

In the prior constructions, it was believed necessary to effect treatment of the surface of the aluminum plate to effect stabilization, as by silicating, before coating the treated surface with a light-sensitive diazo resin or resin forming compound. We now believe that an oxide of aluminum forms almost immediately on the surface of the aluminum plate and that the silicon treatment operates to bring about a reaction between the silicate and the aluminum oxide on the surface to form a hydrophilic layer of an aluminum oxide—silicon oxide which represents a lithographic surface on which the light-sensitive diazo resin compound can be deposited.

Thus it is a further object of this invention to produce and to provide a method for producing a new and improved diazo sensitized metal lithographic plate which has good stability and good shelf life, which is capable of being processed by conventional photolithographic technique to produce an imaged plate, or which can be deep etched to produce a long run plate from which hundreds of thousands of copy can be produced, which can be imaged by exposure to an original for the production of an offset plate or to a negative transparency for the preparation of a direct image plate, in which the etched imaged portion can be plated with a more ink receptive, water repellent metal to render the image even more ink receptive and permanent, and which can be fabricated of a variety of metals in addition to aluminum.

In our copending application Ser. No. 372,715, now abandoned, description is made of one process for producing a stable, light sensitive diazo coating on a copper base, without the necessity for pretreatment to stabilize the surface as previously described. In accordance with the teachings of the aforementioned copending application, the desired effect is achieved by mechanical treatment of the surface, while coated with a sensitizing light sensitive diazo compound. Such mechanical treatment is effected in the aforementioned application by the process of vigorously scrubbing the surface or by working the surface with a squeegee or by passing the plate repeatedly between tightly compressed rubber rollers, or by milling the surface while wet with the diazo compound solution.

It is believed that by such treatment interfering compounds, such as oxides of the metal which normally form on the surface of the metal, are displaced to enable the light-sensitive diazo compound to be intimately associated by reaction, orientation or by the formation of an intermetallic compound with the pure metal to form a surface coating that does not readily decompose but unexpectedly remains stable and light sensitive.

A number of unexpected phenomena are involved in the fabrication of the diazo sensitized metal printing plate of this invention, including the capability of imaging from a negative by photographic means to produce an imaged photolithographic plate and the preparation of a deep etch lithographic plate whereby a photolithographic plate is made available for the printing industry, or the preparation of a gravure plate by means of an electrical or chemical etch of the plate after exposure.

Aside from the described techniques of working the surface by abrading while the surface is covered with solution of the light-sensitive diazo compound, it has been found that other techniques for development of the desired stabilized system, which remains light sensitive, can be employed.

In one such technique, the described conditions for effecting a stable diazo surface coating on the metal plate is effected by incorporation of the light-sensitive diazo compound as an ingredient in a composition with which the surface of the metal plate is abraded or otherwise processed to effect removal of any oxide layer and to expose the raw metal to the diazo compound for the stabilization reaction. As an example, the light-sensitive diazo resin forming compound is formulated as a component in combination with rose tripoli and/or other abradant which is stable to the diazo compound, such as silica dust, glass powder, pumice and the like, as represented by the following:

EXAMPLE 1

Diazo solution:

5 parts by weight p-diazodiphenylamine sulfate-formaldehyde condensate (Diazo Resin No. 4—Fairmont Chemical Company)

85 parts by weight water 25 parts by weight methanol

Scouring paste:

| | |
|---|---|
| 1 ounce | rose tripoli |
| 30 cc. | diazo solution |

The surface 10 of the aluminum plate 12 is rubbed or scoured with the paste to free the aluminum from the oxide on the surface 14 which, after scouring, is not dried but is preferably washed with the diazo solution. This forms a presensitized surface 14 with the diazo compound which remains stable over long periods of time and which remains light sensitive for exposure. Precautions are taken to at all times protect the metal to prevent, as much as possible, oxidation of the abraded surface and control polymerization of the diazo compound. It is therefore contemplated to make use of antioxidants, such as thiourea, during the process, or to carry out the process in an inert atmosphere.

Another technique embodies the removal or inactivation of interfering materials by application of the solution of light sensitive diazo resin or resin forming compound onto the metal surface followed by wiping off the applied coating and repeating the process of application to wet the surface with the diazo solution and removal a number of times until a stable yellow coating remains, indicative of a stabilized diazo-metal system which retains the desired light sensitivity for imaging by light exposure. Usually, the desired stabilization will be achieved within several cycles, depending somewhat on the reactivity of the metal. Each cycle seems to react some diazo with the metal at the surface to reduce the reactivity thereof and to increase the porosity of the surface whereby less and less decomposition of the diazo compound takes place upon subsequent applications until the diazo compound is absorbed in the porous surface without substantial decomposition, even over long periods of time. It may be, as previously described, that the diazo compound reacts as the metal is exposed to form a stabilized intermetallic compound or to the reaction produced to form a stable light-sensitive layer.

Still another concept for achieving the desired stabilization at the surface comprises immersion of the metal surface into the solution of the diazo compound for a period of time during which the interfering materials appear to be removed from the surface for exposure to the underlying raw metal to form the stabilized diazo-metallic system. Long exposure while immersed in the diazo solution appears to react somewhat like repeated application of diazo solutions for diazo modification and stabilization of the surface, as previously described. During immersion, the metal surface is protected from exposure to oxygen so that oxygen is not available to cause decomposition of the diazo compound at the metal surface nor is it available to cause reoxidation of the metal at the surface.

Formation of a stabilized light sensitive diazo-metal surface can also be achieved by protection of the metal surface to prevent oxidation or exposure to oxidation after the metal surface has been cleaned and while it is wet with the light sensitive diazo compound. This can be accomplished by maintenance of the metal surface in an inert or reducing atmosphere, such as in the presence of nitrogen or hydrogen, from the time that it is cleaned and during treatment to coat the surface with the diazo solution. Suitable treatment to prevent decomposition can be achieved by wiping the diazo compound onto the surface of the plate with immediate drying to remove moisture thereby to stop or slow reactions to cause decomposition of the diazo compound or oxidation of the metal surface of the plate.

Another method by which the described concepts can be achieved is by the formulation of the solution of light-sensitive diazo compound to contain an antioxidant, such as urea, thiourea, hydroquinone, and the like. The amount of antioxidant present in the coating composition can range from 0.5 to 5 percent by weight but it is preferred to make use of a solution containing from 1 to 3 percent by weight of the antioxidant.

It will be understood that such treatments can be combined in various combinations in the process to form a light-sensitive diazo stabilized surface, such as by the combination to include an antioxidant in the bath in which the plate is immersed, or in the solution with which the metal surface is abraded or coated and/or to make use of an inert atmosphere during coating, abrading, immersion, and the like, with or without an antioxidant in the solution.

Before effecting the described treatment to form the light-sensitive stabilized diazo-metallic system, it is, of course, desirable to remove dirt, grease, oil, lubricant and the like from the surface of the plate. This can be accomplished in the usual manner by scouring the plate surface with a suitable cleaning or polishing agent such as chalk, pumice, rose tripoli, soap or the like, or the plate surface can be washed in an acidic solution, such as an acid or acid salt, such as may be formed of 1 fluid ounce of 46° Be ferric chloride admixed with 32 fluid ounces of water, followed by rinsing with a solution of 1 fluid ounce of concentrated hydrochloric acid in 32 fluid ounces of water, and then rinsing with water to remove the smut, acid and salts.

As the light-sensitive diazo compound, use can be made of light-sensitive diazo resin forming materials employed in the examples herein or the light-sensitive compounds described in the parent copending application. For example, instead of the p-diazodiphenylamine sulfate—formaldehyde condensate of example 1, use can be made of an aromatic azido resin forming material or an aliphatic azido resin forming material of the type described in the publication entitled "The Aromatic Diazo Compounds," by H. K. Saunders, 1949, published by Edward Arnold & Company of London (page 29), or use can be made of monomolecular imino-quinone diazo, p-tertiary amino diazo resins, or light-sensitive diazo resins or resin forming compounds of the type described in the Jewett et al. Pat. No. 2,714,066.

The amount of light-sensitive diazo compound in the treating solution can be varied over a fairly wide limit depending somewhat upon the type of plate being produced. The concentration of diazo compound in solution may be as great as 10 percent by weight but it is preferred to make use of a solution in which the diazo compound is present in an amount within the range of 0.25 to 10 percent by weight and preferably 2.5 to 5 percent by weight.

Another important phenomenon of this invention resides in the discovery that the degree of polymerization and/or water insolubilization of the diazo light-sensitive compound in the coating formed on the surface of the metal plate greatly influences the manner in which the plate reacts to subsequent development by electrical or chemical etch to produce the deep etched lithographic plate or the gravure plate. The solubility or insolubility of the coating is influenced at least in part by the degree of diazo compound polymerization. Whatever the reason, it has been found that when the diazo compound of the coating is in the form of a monomer, dimer, trimer or other lower polymer which still retains a degree of solubility in aqueous or aqueous alcoholic medium, the etching of the metal surface or the formation of wells in the gravure plate occurs in the portions of the metal surface underlying the unexposed areas of the plate. This is independent of whether or not the plate is immersed in an electrolyte, as the anode, in an electrical etch, or chemically etched. On the other hand, when the diazo compound in the coating is advanced to a high polymeric material as evidenced by relatively greater insolubility in aqueous medium, the portions underlying the exposed portions are etched or engraved during the electrical or chemical etching or engraving process. Thus, a further important concept of this invention resides in the means for controlling the degree of polymerization and/or insolubilization of the diazo compound in the light-sensitive coating for reaction thereof during development to form the image.

The degree of polymerization and/or solubility of the diazo compound of the coating has been found to be influenced by a number of factors which can be employed to determine the character of the plate that is formed.

For example, it has been found that the presence or absence of oxygen during coating and thereafter materially affects the amount of polymerization of the diazo compound or its insolubilization. It has been found that the combination of oxygen and moisture is even more controlling with respect to the degree of polymerization or insolubilization, as will hereinafter appear. It has been found that oxygen favors polymer formation. As a result, means limiting the access of oxygen to the diazo compound to provide for substantial absence of oxygen will result in a light-sensitive stable coating formed of relatively soluble mono-, di-, tri-, or lower polymers of the diazo compound in the coating. On the other hand, the presence of oxygen, during treatment or afterwards in an activating state, will promote polymer formation whereby a high polymeric diazo compound in a substantially insoluble from will be produced in the coating.

The absence of oxygen for use in the production of a lower polymer and relatively soluble light sensitive coating can be achieved by carrying out the coating operation in an inert or reducing atmosphere or by forming the diazo stabilized light-sensitive coating by the process of long immersion whereby the surface of the metal are not exposed to oxygen during sensitization with the diazo compound.

It has been found further that the presence of a nonoxidizing or reducing agent in the coating or coating composition will operate to retard polymerization of the diazo compound whereby the resulting coating will be relatively soluble and the diazo compound will be in the form of a mono-, di-, tri- or lower polymer. This can be achieved by the formulation of the coating composition to include an antioxidant of the types previously described in the amounts described. It will be understood that the converse will be true in that absence of an antioxidant or reducing agent will permit free polymerization of the diazo compound to form a relatively insoluble coating in which the diazo compound is present in the form of a high polymer if other conditions encouraging polymerization are employed.

Such other factors which influence insolubility and degree of polymerization of the diazo compound include temperature. Low temperature during preparation of the presensitized plate and storage operates to minimize polymerization, especially in the relative absence of oxygen and/or moisture and relative absence of light. For maintaining solubility and the lower polymeric form of the diazo compound, it is desirable to avoid exposure of the presensitized plate to a temperature over 125° F. during coating and storage of the plate. On the other hand, aging of the diazotized plate at elevated temperature in the range of 200° to 250° F. or higher for a period of time results in high polymer formation of the diazo compound and relative insolubility of the coating to produce a plate in which the etch or gravure cells will be formed in the portion underlying the exposed portions of the coating.

Before entering into a discussion of the etchant or engraving procedure for production of a deep etched lithographic or gravure plate, description will first be made of the preparation of a presensitized photolithographic plate. For this purpose, it is desirable to provide the described presensitized coating on a metal surface and to employ conditions which will produce a stabilized light-sensitive diazotized layer in which the light sensitive diazo component is in the stage as hereinafter referred to as the A stage, in which the coating is water soluble and in which the diazo component is in the mono-, di-, tri- or lower polymeric form.

Having defined the basic requirements, illustration will be made by way of example which are given by way of illustration but not by way of limitation, of the practice of this invention.

EXAMPLE 2

The aluminum presensitized photolithographic plate is prepared as in the process of example 1 which was used to illustrate the formation of a stabilized diazotized metal coated surface with an abradant.

The amount of light sensitive diazo resin in the diazo solution can be varied over a fairly wide limit, consistent with the ability to form a paste with the scouring material in which sufficient of the diazo resin is present for the combination with the aluminum as it is exposed. Thus the concentration of the diazo resin in the solution can be varied up to as much as 25 percent but it is preferred to make use of between 0.25 percent to about 10 percent by weight of the solution and the ratio of the light-sensitive diazo resin to the scouring medium can be varied over a fairly wide range such as within the range of one part by weight of diazo resin to 2–50 parts by weight of the rose tripoli or other scouring medium. It is preferred to work with a paste for efficient abrasion and continuous coverage with diazo solution. Thus additions of solution or abradant can be made from time to time.

The plate prepared in accordance with the preceding example is stabilized against the decomposition of the diazo resin compound so that additional amounts of diazo resin can be applied from solution onto the stabilized surface, depending somewhat upon the use to be made of the plate. The plate can be used as a presensitized photolithographic plate by exposure through a negative transparency or to a positive whereby the diazo in the exposed portions is converted to an ink receptive, water repellent, water insoluble imaging material which remains strongly anchored to the surface of the plate, while the diazo resin in the unexposed portions can be washed from the surface of the plate by the developing solution to expose the underlying lithographic, water receptive, hydrophilic, nonimaged areas of the plate.

The exposed and developed plate can be mounted on a lithographic printing press for use in the production of a large number of copies of good quality. The plate that is produced is one that is characterized by the formation of the image on the surface, as in the Jewett et al. patent, but in which the surface constitutes a base which differs from that of the silicated aluminum oxide of the aforementioned patent. The adhesion of the image to the surface of the plate is outstanding.

While best results are secured when the light-sensitive diazo resin is incorporated as a component in combination with the inert abradant to enable stabilization by reaction or combination with the aluminum, as it is freed by the abradant, a sufficient degree of stabilization can be achieved when the light-sensitive diazo compound in solution is applied for treatment of the aluminum surface independent of the abradant by substantially immediately following treatment of the surface to remove oxides normally formed on the surface, as by scouring with rose tripoli, pumice, silica, etc., wire brushing, rubbing and the like. For this purpose, it is preferred to make application of the light-sensitive diazo compound from aqueous alcoholic solution.

The procedure of example 2 can be followed with the substitution of a zinc plate for the aluminum plate to produce a zinc photolithographic plate which can be imaged by exposure through a negative transparency, a positive transparency or the like to convert the diazotized portion in the exposed areas to an ink receptive, water repellent imaging material from which thousands of copies of good quality can be produced. Other metals can be substituted for the aluminum or zinc.

Description will now be addressed to the practice of this invention in the preparation of a presensitized metal plate which finds use in the preparation of an etched or deep etched lithographic plate in which the resulting surfaces of the metal plate are not only differentiated between hydrophilic nonimaged portions and hydrophobic imaged portions but in which the etched lithographic portions are depressed from about 0.0002 to 0.0005 inch below the surface of the hydrophilic nonimaged portions.

This phase of the invention can be practiced with the diazo light-sensitive coating in the A or in the B stage. If in the B stage or polymerized state, representative of the preferred practice of this phase of the invention, the etch will preferably be made to take place in the metal surface underlying the exposed portions of the coating, as will appear from the following general detailed description and examples.

The litho-etch process of this invention can be practiced best with metals such as copper, zinc, aluminum, iron, stainless steel, brass, tin, lead, magnesium, chromium, and alloys thereof.

In the preparation of a litho-etch plate, it is desirable to make use of a layer of the light-sensitive diazo compound having considerably greater thickness than for the presensitized photolithographic plate of the type heretofore described. For this purpose, it is desirable to incorporate a higher concentration of the light-sensitive diazo compound in the coating composition in order to deposit a higher concentration of diazo resin on the surface. In the preferred practice one or more additional layers 16 of diazo is deposited on the diazo stabilized aluminum surface 14.

The desired thickness of light-sensitive diazo resin coating can be achieved by treatment of the diazo stabilized surface of the aluminum plate with a solution of the diazo component in water and alcohol having a concentration within the range of about 1 percent to 10 percent by weight and preferably 3 percent to 8 percent by weight, as represented by the following example:

EXAMPLE 3

5 percent by weight light sensitive diazo resin (Fairmont Chemical Company—No. 4)
20 percent by weight methanol
75 percent by weight water The solution can be flow coated or roller coated onto the surface 14 of the diazo stabilized aluminum plate of example 2 and then air dried or drying can be accelerated with warm air at a temperature of about 50° C. in the presence of oxygen to from the B stage coating. The formed litho-etch plate can be stored in the dark for a relatively long period of time without deterioration of the light sensitivity of the plate.

In the use, in the preparation of a litho-etch plate, a negative transparency 18 is positioned on the sensitized surface of the aluminum plate and exposed to a carbon arc lamp 20 of 110 volts and 20 amps at a distance of about 24 inches for about 10 minutes. Other exposure techniques, well known to the art, can be employed, as by exposure to xenon pulsed lamps and the like, and the exposure can be made through a negative transparency or a positive transparency.

The exposed plate is then subjected to an electrical etch in which the exposed plate 22 is immersed in the electrolyte 24 as the anode while use is made of a zinc rod as the cathode. The electrical etch makes use of an electrolytic bath formulated of 1 pound zinc chloride per gallon of water.

With the exposed plate 22 suspended in the electrolyte as the anode and with a zinc plate 26 suspended in the bath as the cathode, a current of about 1 to 2 volts and about 1 to 2 amps is supplied for from 3 to 15 minutes.

It will be found that the electrical etch occurs beneath the exposed portions of the coating and not beneath the unexposed portions to yield a deep etch containing the oleophilic image.

The intensity of the current and the time of etch can be varied over fairly wide limits but when it is desired to etch from under the exposed portions of the plate, the upper limit is defined by the time or intensity at which an etch begins to appear in the production of the plate surface underlying the unexposed portions of the plate.

When removed from the electrolytic cell, the electrolyte should be washed from the surface of the plate with alcohol for complete removal and for rapid drying of the plate surface.

The surface of the plate may then be treated with a desensitizer of the type conventionally employed in lithographic duplication, with or without previous lacquering of the plate surface. The desensitizer is applied preferably with rubbing with a cotton pad or the like to remove diazo resin from the surface of the plate. The plate may be inked or lacquered either before or after desensitization or the oleophilic type image left after the etching step may be used as such.

The resulting plate is strongly hydrophobic in the etched portion 30 and hydrophilic in the unetched, nonimaged portions 32 of the plate. Thus the plate can be mounted on a conventional lithographic press for wetting sequentially by aqueous fountain solution and then by oleaginous ink to wet out the etched imaged portions of the plate for transfer of the zinc image from the plate to an offset blanket or directly to copy sheets.

By reason of the formation of the image as wells which extend into the surface of the metal plate, very little image wear will take place during use. As a result, the plate retains its image for the production of many thousands of copies and the plate can be used any number of times without deterioration of the image.

Other electrolytes can be employed for the electrolytic etch. Such other electrolytes can be represented by aqueous solutions of salts such as sodium chloride, zinc chloride, magnesium chloride, hydrochloric acid, or combinations of any of these. The time of the exposure to the electrolytic etch will depend somewhat upon the intensity of the current and concentration of the salts making up the electrolyte.

As pointed out above, when it is desired to etch under the image (exposed) portion of the plate, the upper limit of time of etch or intensity of current is when an etch begins to appear in the areas underlying the unexposed portions of the plate. It is possible by controlling certain variable in the etching process, such as electrolyte, electrolyte concentration, current density and cathode system to control the mode of etching and achieve etching under the exposed or unexposed portions as desired. The plate metal itself can influence the course of the reaction. For example, an exposed magnesium plate, containing either polymer A or polymer B on its surface, is etched violently in a zinc chloride electrolyte—zinc cathode system in the areas underlying the unexposed portions of the plate. A similar exposed magnesium plate having some areas containing polymer A and other areas containing polymer B, when subjected to etching in a magnesium chloride electrolyte—magnesium cathode system, shows etching under the exposed portion of the area covered by the B polymer and at the exposed portion of the area covered by the A polymer.

It is also believed that the mode of etching can be influenced by the tendency of the metal to anodize and by the degree of polymerization and, therefore, the solubility characteristics of the diazo compound on the plate surface.

This invention contemplates the further improvement in the permanency and ink receptivity of the image by flash coating to form a layer of copper or the like hydrophobic metal as a lining in the wells formed by the etch. This can be accomplished by plating with a bath formed of an alkaline solution of copper sulfate, as represented by the following example:

EXAMPLE 4

Figure 5:
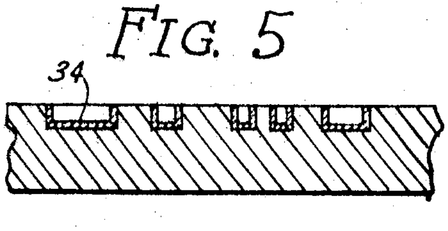
FIG. 5 is an enlarged perspective view partially in section of a modification of the etched plate of FIG. 4 with the imaged portion plated with an ink receptive, water repellent metal.

9 grams ethanolamine
5.5 grams copper sulfate
300 cc. water
1 percent gum arabic The background, corresponding to the unetched or nonimaged portions of the plate, will not be copper plated while the walls of the wells formed by the deep etch will receive a thin copper coat to render the imaged portions permanently hydrophobic. Such plating is illustrated in FIG. 5 where 34 indicates the plating in the wells.

EXAMPLE 5

Using zinc as an example, the surface of the zinc plate is first cleaned or degreased, as with rose tripoli, and counteretched with hydrochloric acid (2percent). The plate is then coated with diazo resin by any of the means or combination of means to produce a B-type coating of insoluble higher polymer light-sensitized stabilized diazo coating.

The diazo compound is deposited from water and alcohol solution, preferably with a heavier coating than in the previously described presensitized photolithographic plate of example 1. The plate is dried in air and exposed through a suitable negative to light source such as an arc or an ultraviolet bulb. After being exposed, the plate is etched in a salt bath, preferably a zinc chloride bath. The plate constitutes the anode in the bath and a zinc cathode is used. Etching is carried out for 3 minutes and an EMF of 1.5 volts and 2 amps per 100 square inches for a period of 1 to 20 minutes. During etching, zinc is removed from beneath the exposed portions of the coating, but the coating remains bonded to the metal in such areas. After removal from the etching bath, the plate is washed with alcohol and dried.

As the next step, lacquer and developing ink may be applied. Application of these materials protects the exposed areas from desensitizer used in the following step and provides receptiveness for ink in the exposed areas. As a next step, a desensitizer is applied usually with slight rubbing. The desensitizer may be water but it is preferably formulated of an aqueous solution of an acid, gum arabic and phosphates. The exposed areas are unchanged but the yellow coating remaining in the unexposed areas is removed to provide a hydrophilic metallic surface and the plate is then ready to be mounted on an offset press for the preparation of copies.

EXAMPLE 6

A sheet of lithographic zinc (Matthiesen and Hegeler Zinc Co., LaSalle, Ill.) is lightly rubbed with rose tripoli and water, rinsed, then counteretched for one minute with 2 percent hydrochloric acid.

the zinc is rinsed, and immediately coated by flowing on diazo solution prepared by dissolving 7 grams of diazo resin in 85 cc. or water (diazo resin No. 4, Fairmont Chemical Company, Newark, N.J.) then adding 33 cc. of methanol and 6 cc. of acetone. The excess if flowed off and the diazo solution remaining levels itself on the horizontal surface, then warm air is used to dry the diazo resin. It will be obvious to those familiar with diazo presensitized aluminum plates that a greater quantity of diazo resin is used for our process.

The sensitized sheet may now be stored or used immediately. The sensitized plate is exposed under a negative and exposed in a vacuum frame 24 inches from a 20 ampere 110 volt carbon arc for 20 minutes. The exposed areas are blue. The unexposed areas are the yellow of the diazo coating.

The exposed plate is now made the anode in a bath containing a zinc chloride solution containing 1 pound of zinc chloride per gallon of solution. A zinc cathode is used and electrolysis is carried out at 1–2 volts and 0.02 ampere per 100 square inches for 6 minutes. The electrolyzed sheet now carries a black image and is removed from the bath, washed by pouring methanol or ethanol over it and dried quickly with a current of warm air.

The dried plate is now rubbed with a lithographic deep etch lacquer (no. 3014, Litho Chemical and Supply Co., Lynbrook, N.Y.) from a piece of cotton in all directions, and is then rubbed down with a developing ink (2414 of Litho Chemical and Supply Company, Lynbrook, N.Y.)

The rubbed down plate is now rubbed with an aqueous litho desensitizer (Alum-O-Lith desensitizer, Harris Intertype Corporation, Cleveland, Ohio) whereupon the dark oleophilic image appears against a clear hydrophilic background.

The plate is mounted in a lithographic offset press (No. 1,250 Multilith, Addressograph-Multigraph Corporation, Cleveland, Ohio) and printed to 30,000 excellent copies distinguished by sharp cut heavily inked symbols and clear white background. Image wear could not be detected.

EXAMPLE 7

A plate of lithographic zinc is cleansed with rose tripoli then immersed in a solution of 8 grams of a diazo resin comprising p-diazophenylamine sulfate condensed with formaldehyde (for instance, Diazo Resin No. 4 sold by Fairmont Chemical Company, Newark, N.J. dissolved in 81 N.J.), of water, 33 cc.

of methanol, 6 cc. of acetone for 1 minute. It is then removed and the excess is doctored from the plate. The thus coated plate is then exposed under a negative for 12 minutes at 24 inches from a 20 ampere carbon arc. It is etched as the anode in zinc chloride bath containing 1 pound of zinc chloride per gallon of solution and using another zinc plate as the cathode during 3 minutes at 3 amperes and 2 volts. Developing ink and lacquer are then rubbed into the plate, then the coating is removed in unexposed areas by applying an aqueous desensitizer. The plate is mounted in an offset press. Good printing results are obtained.

EXAMPLE 8

Another Embodiment—Plates Printable by Letterpress

Another surprising feature which provides particularly great usefulness to the invention is that: although the coating in exposed areas remains attached to the metal as the metal is eaten away in exposed areas during etching for a short period of time, if desired, etching may be carried out for a longer period of time whereupon the well in the metal (in exposed areas) is made much deeper and the bond between the coating and the metal (in these areas only) is destroyed and the coating is removed. Thus, by carrying out etching for a longer period of time, the exposed areas are provided with a deep etched hydrophilic metal surface, and the unexposed areas remain coated with light-sensitive material. Since the unexposed areas also remain hydrophilic and since the deep welled metal surface is also hydrophilic, a plate made in this manner is of the dry offset type or "letter set" type. It is printed as a letterpress plate; no water is used.

EXAMPLE 9

Another Embodiment—Deeper Etched Plates with High Areas Hydrophilic

Plates of the previous embodiment (after following all the steps mentioned therein) are exposed without a negative to harden the previously unchanged coating in the unexposed areas. The plate is then treated with developing ink and lacquer to insure an oleophilic surface in the coated areas and with gum arabic to be sure that the deep welled metallic areas remain hydrophilic.

EXAMPLE 10

Another Embodiment

Plates which have undergone the steps of the previous embodiment are placed in a copper plating bath and the bottoms of the wells are plated with copper; the treated areas which were first unexposed and were then hardened with light and made oleophilic, repel copper. A plate is thus obtained with which long offset printing runs may be made.

EXAMPLE 11

Another Embodiment

The coating on the originally unexposed areas of the plate of the previous embodiment is removed by scrubbing to expose a hydrophilic zinc surface in the highs. Long offset printing runs may be obtained with the plate thus made. Even longer runs may be obtained by plating the exposed zinc surfaces with chromium.

EXAMPLE 12

Another Embodiment

We plate a copper plate with zinc, coat with a light-sensitive layer comprising a diazo compound, expose under a line or halftone negative and etch as anode in a salt bath whereby the zinc under the exposed areas is etched away to reveal copper. The etched plate is washed with alcohol and dried and is then lacquered or inked (or both) in the wells (in each of which a copper surface is exposed). Then the unexposed diazo compound is scrubbed away with aqueous media to reveal hydrophilic unetched zinc surviving under the unexposed areas.

This simply prepared lithographic plate is particularly suitable for long run lithography.

The following description is directed to the preparation of printing plates for subsequent exposure an image development in a manner to provide a gravure or graded gravure printing plate. The invention will first be described with reference to the preparation of a graded gravure copper plate but it will be understood that the concepts have application to the production of gravure plates of other metals, for example, bronze, brass, silver or alloy of silver, magnesium zinc, iron, and the preparation of other types of printing plates from such metals.

Relatively pure copper or copper alloy, that is, metal containing at least 95 percent copper, has been found preferable, but generally the invention is applicable to metal printing impressing members, that is, plates or cylinders, wherein the metal is an alloy comprising at least about 40 percent of copper or silver or both, copper being preferable to silver in the majority of cases because of economic considerations.

After washing the cleaned surface it is immersed or otherwise coated with a solution of diazo resin, preferably the condensation product of formaldehyde and p-diazodiphenylamine sulfate applied as the zinc chloride double salt. It is suitable to use, in place of the diazo resin, uncondensed p-diazodiphenylamine sulfate or certain other diazo compounds. The surface is preferably treated mechanically with considerable force while it is thus immersed. The treatment is that which would be required to drive the treating solution in pores of a porous material which was not easily penetrable by fluid. Such force may be applied by repeatedly squeegeeing the surface, by repeatedly running the plate between tightly compressed soft rubber rollers, by running it only once or twice under high pressure between hard surfaced rollers (e.g., rollers covered with 95 durometer rubber), by pounding or scraping the plate or ball milling the plate while maintaining its immersion in the solution. The plate is then aged by heating to a temperature of 60° to 100° F. for 2 and preferably from 8 to 16 hours in order to achieve the desirable high polymerization of the diazo resin.

The plate is then exposed, through a positive (for photogravure) or negative (for photoengraving) transparency to a suitable source of ultraviolet light for from 1 to 25 minutes depending upon the intensity of the light and the density of the image in the transparency. The plate may then be heated at from about 150° F. to about 200° F. for a period of from 1 to 5 minutes, or alternatively is treated first with cupric bromide and then with ferrocyanide, each of these treatments being alternative methods of hardening the film to set the image. If hardened in the first manner the plate is then etched electrolytically by placing it in a solution of a salt such as a sodium chloride or a copper sulfate solution, then connecting it as the anode in an electrical circuit, using a cathode of the same metal, and then passing a current through the solution. If the film has been chemically hardened by the second method; i.e. use of cupric bromide and ferrocyanide, the plate is then capable of being chemically etched with ferric chloride in the same manner as are the plates of the prior art.

During the treatment with cupric bromide and ferrocyanide in one case or during the electrolytic etching in the other case, the diazo layer is polymerized, cross-linked or condensed into a continuous film extending across the entire surface of the plate. It is to be particularly noted that the film is not discontinuous. It may be stripped from the surface of the plate after etching is completed by directing a stream of water at the surface of the plate.

Upon microscopic observation at 100$x$ graininess of the film is observed but the film shows no differences in exposed areas through which the etchant penetrates from those unexposed areas through which it does not. The nature of pores in the film which are relatively unobservable at 100$x$ magnification is believed to control the rate of penetration of ferric chloride etchant or the electrolytic etching action, and to exert control in such manner that no undercutting occurs. In any event it is true that no undercutting results, no matter how deeply the etching is carried out, if etching is not carried beyond the point normally required to produce a graded gravure plate of the highest quality.

After etching, the plate is washed to remove the film. If it has been electrolytically etched it is then washed with alcohol such as methyl alcohol to remove cuprous chloride which is produced in the bath by the electrolytic action. It is then polished and then protected with a greasy material in any suitable mode including those which are conventional with prior art plates. Polishing may be carried out with "Putz Pomade" which is a natural earth or rouge, or with other fine grained polishing agents, or may be carried out by electrolytic polishing, Vaseline may be used as subsequent protective material.

The first step in the process, that is, the cleaning step, may be accomplished merely by scouring with rose tripoli and placing the surface in distilled water to wash away excess rose tripoli. Alternatively one may first scour with rose tripoli and then scour with white tripoli, or whiting. This material is alkaline so it is then desirable to wash the surface with lactic acid, and to then rinse or wash with distilled water. Another useful method of cleaning is to immerse the copper surface in a solution of 1 fluid ounce of 46° Be ferric chloride diluted to 32 fluid ounces with water and then again rising. Conventional electrolytic cleaning and electrical polishing may be used in addition or alternatively. Treatment of the copper surface with acid, after washing, is preferably in some instances.

The succeeding step, that is, the step of sensitizing the plate, is initiated when the plate is still wet from the washing step, that is, while the plate is still wet with distilled water used in washing or rinsing.

To accomplish the sensitization of copper plate with a diazo compound, the copper surface is exposed to the sensitizing solution by immersion in the solution or by allowing a coating of the wet solution to stand on the surface of the plate. The interface between the copper and the sensitizing solution is mechanically treated during a portion of the time that the plate is exposed to the coating solution. Such mechanical treatment may be accomplished by a vigorous scrubbing with a squeegee or by repeatedly passing the plate between tightly compressed rotating rubber covered rollers, or by placing the plate in a ball mill which contains the coating solution. If such rubber rollers are used, it is often but not always preferable to pass the plate between them 20 or 30 times if they are of low durometer. If the rolls are covered with 95 durometer and high pressure is used, a single passage through the rollers is usually sufficient. It is preferable to limit the exposure of the plate to the coating solution, by immersion, to about 4 to 6 hours although operable results may be obtained if the plate is allowed to remain immersed as long as 10 to 12 hours at a low temperature such as 60° F. to 70° F.

The sensitizing solution is preferably an aqueous solution of a diazo resin but certain nonresinous diazo materials may suitably be used in some instances. Preferably, but not necessarily, the sensitizing solution contains an appreciable amount of a monohydric alcohol containing one to three carbon atoms.

As a third substep in this step, the diazo is polymerized preferably by aging. The period of aging may be made shorter by use of a higher temperature as by exposure to $0_2$. Aging for at least 30 minutes and preferably any time longer than about 4 hours at room temperature, that is, at 60° F. to 100° F. is generally satisfactory, although, if aged at room temperature, aging at 70° F. to 90° F. for at least 8 hours is preferred to insure optimum results. Aging time may be correspondingly shorted by carrying out the aging process at temperatures of from 100° F. to 300° F.

Upon completion of the aging step, presensitization of the plate is completed. It may then be utilized immediately or it may be stored for weeks or even months until needed, and may then be utilized.

In order to utilize a plate, it is exposed to ultraviolet light which is caused to reach the plate surface in a desired pattern. A suitable pattern for graded gravure work is provided by a screened partially transparent photographic film positive or original.

If desired, after exposure the film may be heated (a step we have chosen to call "hardening") to set the image by exposing it to temperatures of from 150° F. to 175° F. for from 1 to 10 minutes.

In the preferred embodiment of the process, the exposed plate is then made the anode in an electrolytic system. By the action of electrolysis, both exposed and unexposed areas of the coating are transformed into a continuous film. The film may readily be observed if the plate is subjected to a stream of water sent under pressure against the surface. The film is stable in its thus water-plasticized condition, but becomes brittle when allowed to dry. The film carries the image under which it has been exposed, and this image may be observed to persist after removing the washed film from the copper plate and mounting the washed film on a glass plate.

It may be observed that an etched image is provided by electrolysis, the image being in register with the film image and the etching depth being generally inversely proportional to the amount of light to which the film was exposed during exposure to ultraviolet light.

Furthermore the etched image in the plate exhibits no undercutting of the walls of the pits or recesses. For this reason the etching may be carried out to produce pits or recesses having a maximum depth of only about 30 microns instead of a depth of 35 to 40 microns as is required with conventional graded gravure methods. This is true because impressing a plate having undercut recess walls against a piece of paper does not remove all of the ink from the recesses; some remains in the corners. Consequently the pits or recesses have to be made deeper in order to provide enough ink, in addition to that which remains in the corners, so that the amount which remains on the paper provides a suitably dark spot in register with each pit or recess. Because the pits or recesses are made in accordance with the present process are not undercut, substantially all of the ink is removed from each one when the plate of the invention is impressed against a piece of paper.

The following examples illustrate the invention:

EXAMPLE 13

A plate of hard copper suitable for photoengraving is cleansed with rose tripoli, then immersed in a solution of 8 g. of a diazo resin comprising p-diazophenylamine sulfate condensed with formaldehyde (for instance Diazo resin No. 4 sold by the Fairmont Chemical Company, Newark, N.J. dissolved in 81 cc. of water, 33 cc. of methanol, 6 cc. of acetone for 1 hour. While thus immersed it is repeatedly passed through rotating rubber rollers which are tightly compressed together. The excess is doctored from the plate. The thus coated plate is allowed to stand overnight in the dark at 70° F. to 90° F. and then is exposed under a partially transparent film original suitable for graded gravure reproduction, for 12 minutes at 24 inches from a 20 ampere carbon arc. The exposed plate is heated in an oven at 150° F. for 5 minutes. It is etched as the anode in 20 percent sodium chloride bath using another copper plate as the cathode during 7 minutes under 3 amperes and 2 volts. A continuous film is formed on the surface during etching. This is removed with water and the plate is polished with a conventional mild abrasive polishing powder, then inked and printed on suitable paper. A graded gravure image of high quality is thus obtained on the paper.

EXAMPLE 14

A plate of hard copper prepared as in example 13 was immersed in a solution of 9 g. of the same diazo resin in 66 cc. water, 33 cc. methanol, 15 cc. of solution containing 1.55 cc. of commercial gum arabic solution and 6 cc. of acetone for 45 minutes, then treated with rollers as in example 13. then was doctored and left to age about 8 hours at 70° F. to 85° F. The plate was exposed as in example 13 for 12 minutes, then heated 4 minutes at 150° F. The plate was etched under the conditions of example 13 for 7 minutes.

The etched plate was polished and proofed to a handsome image of the original graded gravure image.

It was observed the commercial graded gravure partially transparent film original showed at 20X a slight raggedness of the edges of the screen, conventionally unobjectionable because in the gum bichromate process the raggedness would disappear. However, the sensitization in depth of the diazo resin and consequent lack of side attack during the electrolytic etching reproduced this imperfection exactly in the copper, thus demonstrating the fidelity to detail of the process of this invention.

EXAMPLE 15

The gum arabic of example 14 is present as a wetting agent and is not analogous in function to the colloid of the gum-bichromate process. When 50 cc. of an aqueous solution containing 15 cc. of commercial gum arabic solution (Harris Lovisgum) was added to 50 cc. of the satisfactory sensitizing solution of example 14, the solution was less satisfactory. A copper plate was immersed in this solution for 2 hours, roller treated as in example 13, doctored and allowed to stand overnight at room temperature (60° F. to 100° F.). It was exposed for 15 minutes, then was heated to 150° F. for 5 minutes. It was electroetched for 15 minutes and yielded an image not equal in quality to plates obtained without gum arabic or with minor amounts of gum arabic.

EXAMPLE 16

A hard copper plate of the grade used in photoengraving was cleaned with rose tripoli and then with whiting and then was acidified in 5 percent lactic acid to remove traces of whiting and was then thoroughly rinsed in distilled water. The plate was then immersed 3 hours in a solution of the diazo resin of example 13 made up of 12 g. of diazo resin, 66 cc. of water, 15 cc. of aqueous solution containing 1.5 cc. of commercial gum arabic solution, 33 cc. methanol and 6 cc. of acetone and roller treated as in example 13. The plate was doctored, dried, aged in the dark 16 hours at 70° F. to 80° F. and exposed 9 minutes to ultraviolet light under an original suitable for graded gravure. The exposed plate was immersed for 5 minutes in an 0.5 percent cupric bromide solution; rinsed, then immersed in 5 percent sodium ferrocyanide solution 3 times for 5 minutes each with intermediate rinsing. The plate stood 2 days and then was etched in successive ferric chloride solutions for various periods of time at room temperature as follows:

| $FeCl_3$ concentration, ° Baume | Time |
|---|---|
| 43.8 | 3 min. |
| 40.7 | 2½ min. |
| 43.8 | 4 min. |
| 37.3 | 5 min. |
| 43.3 | 7 min. |
| 40.7 | 6 min. |
| 37.3 | 8 min. |

The plate was then rinsed, stopped with methanol, and polished with Putz to yield a handsome version of the original used in which the copper wells varied in depth from 3 microns in the highlights to 27 microns in the shadows.

In this case the polymerization reaction probably occurs first at the air surface of the film and the course of the reaction is more difficult to control than when carried out electrically. The exposed copper plate when placed in cupric bromide solution develops an image which now can be wiped with wet fingers without disturbance. If the cupric bromide treatment is continued eventually a blurred image is formed. Immersion of the cupric bromided plate in sodium ferrocyanide solution appears to set the image, it becomes reddish in tone and the action of the cupric bromide appears to cease. At this stage the film has not been formed as a jet of water does not disturb the image. Film formation and corresponding copper etching occurs when either the copper bromided ferrocyanided plate or the noncopper bromided plate is immersed in strong ferric chloride solution.

EXAMPLE 17

A cleaned copper plate was sensitized by (1) 2 hour immersion in a solution of 24 grams of diazo resin in 243 cc. of water, 99 cc. of methanol and 18 cc. of acetone, (2) mechanical treatment and (3) the plate was in storage overnight. It was then exposed under a gravure original, then warmed at 175° F. for 4 minutes. The plate was made the anode in an electrolysis bath containing 42 grams of copper sulfate per gallon of distilled water. Current was passed at 3.5 amperes per 100 square inch at 9.5 volts. The continuous film which was formed on the surface was scrubbed away and the polished plate showed a gravure image comprising shallow wells etched to about 5 microns depth.

EXAMPLE 18

Addition of 32 cc. of concentrated sulfuric acid to the copper sulfate bath caused attack on the continuous film so that plates like that of example 17 treated otherwise in the same way showed a broken film after 9 minutes electrolysis at 13 amperes per 100 square inches and 2.5 volts.

EXAMPLE 19

The sulfuric acid copper sulfate bath of example 17 was used to polish an etched plate. An etched unpolished plate prepared in accordance with any preceding example was treated with turpentine, then chloroform to remove grease. It was made the anode in a bath having a copper cathode and composed of 42 grams of copper sulfate and 32 cc. of concentrated sulfuric acid. Current was passed through the bath at 4 amperes per 100 square inches and 2.5 volts for 1 minute. The plate was lightly polished with "Putz Pomade" familiar to photoengravers and revealed a highly polished surface.

EXAMPLE 20

To a saturated solution made by mechanically stirring 350 cc. of distilled water with 24 g. of p-diazodiphenylamine sulfate and which was decanted from undissolved salt, 270 cc. of methanol and 20 cc. of acetone were added. Copper plates cleaned with rose tripoli were immersed for 2½ hours in this solution, doctored, stored 45 hours, reimmersed in the sensitizing solution for 20 minutes, then were repeatedly run through a rubber roller wringer. After then aging 2 to 4 hours the plates were exposed under a gravure original at 24 inches from a 20 ampere arc lamp for 2, 4, 8 and 12 minutes, then were heated 4 minutes at 175° F.

The plates were etched 10 to 12 minutes at 3.3 volts and 40 amperes per 100 square inches in 3 percent sodium chloride solution. The best engravings were obtained from the plates exposed 12 and 15 minutes. (The film from these plates was not continuous.)

EXAMPLE 21

A copper plate was cleaned with rose tripoli and was sensitized by immersion for 2 hours in a solution of 24 grams of the diazo resin of example 13 in 243 cc. of water; 99 cc. of methanol and 18 cc. of acetone and by roller treatment as in example 20. The plate was doctored and then aged by being stored overnight. It was then exposed under a gravure original for 12 minutes at 24 inches from a 20 ampere 110-volt arc lamp. The plate was then heated at 175° F. for 4 minutes. The plate was then made the anode in an electrolysis bath containing 42 grams of copper sulfate per gallon. Current was passed at 3.5 amperes per 100 square inches at 9.5 volts for 22 minutes. The surface film which was formed was then scrubbed away and the plate was polished to reveal a handsome but shallow etched gravure image.

This bath is useful to promote light attack in all areas including the heavily illuminated highlight areas whence it may be transferred to other electrolyzing baths for major attack on middle tones and shadow areas. These are, of course, operational details depending on the result desired by the etcher.

EXAMPLE 22

Example of exposure conditions. It will be appreciated that exposure conditions will depend on concentration of solution, quantity applied to the plate, type of original, etc.

a. A plate sensitized as in example 21 was exposed under a gravure image for 8 minutes, then part was masked and the remainder exposed a further 5 minutes. The plate was heated at 175° F. for 4 minutes, then was electrolyzed as anode in a 3 percent sodium chloride solution at 3.5–3.7 volts and 10 amperes for 24 minutes. Under these conditions the plate which had been exposed 8 minutes gave more excellent differentiation in the highlights and in the shadows than the plate which had been exposed 12 minutes.
b. A standard plate like that of the previous paragraph was exposed under a graded gravure screen 6, 9, 12 and 15 minutes. The plate was heated to 175° F. for 4 minutes, then was electrolyzed as anode in a 3 percent sodium chloride bath for 16 minutes, then was electrolyzed as anode in a 3 percent sodium chloride bath for 16 minutes at 10 amperes per 100 square inches and 3.7 volts. The 6-minute exposed area showed a more complete range of the original than the 15-minute exposed area.

EXAMPLE 23

A hard copper plate was cleaned with rose tripoli, rinsed, cleaned with whiting, rinsed, immersed momentarily in 5 percent lactic acid, rinsed, then immersed for 3 hours in a solution made up from 12 g. of diazo resin No. 4, 66 cc. of water, 6 cc. of acetone and 15 cc. of gum arabic prepared by diluting 10 cc. of "Lovisgum" 100 cc. with water. The plate was doctored through pressure rollers until no ridges of excess diazo compound were apparent on the dried plate, in other words the plate was dried, if the coating was not even, then it was reimmersed in the sensitizing solution and doctored until an even coating was obtained. The plate was exposed 9 minutes under a screened positive transparency to an arc lamp. It was immersed all at once in 0.6 percent cupric bromide solution for 5 minutes, rinsed, then immersed three times with intermediate rinsing in 5 percent sodium ferrocyanide solution. The plate was allowed to stand for 2 days, then was etched in ferric chloride solution using the following concentrations and times:

| Ferric chloride Concentration °Be. | Time Minutes |
|---|---|
| 43.8 | 5 |
| 40.7 | 6 |
| 43.8 | 7 |
| 37.3 | 8 |
| 43.8 | 8 |
| 40.7 | 7 |
| 37.3 | 6 |
| 43.8 | 4 |

The plate was rinsed, washed with methanol, then polished to yield a graded gravure etching varying in depth from 5 microns to 33 microns.

The dilute solution of light sensitive diazo resin just described, may be applied to the exposed surface of the copper alloy sheet, or equivalent, above described, by a roll coating method, for example. Running the sheet in pressure contact with a rotating rubber roller, which is wet with the dilute diazo solution, applies a thin continuous coating of the diazo solution over the surface. It is preferred that the diazo coating be an extremely thin one, for example, leaving a residue of about 0.003 gram, or even less, e.g. 0.001 gram, of the diazo resin per square foot of plate area. For special purposes, e.g. to obtain a visible image after exposure, a heavier residue of diazo resin, but still a thin film, can be coated on the surface. After the diazo coating is dried and aged, the sensitized sheet is then die cut to standard plate sizes and, continuing under subdued light, the plates are packaged in light-tight packages, in which they are sent to the users and customers.

EXAMPLE 24

Edes rotogravure copper was lightly scoured with rose tripoli and water to preserve the mirror finish. Sheets heated at 35°, 50° and 85° C. were strongly rubbed with cotton saturated with a 5 percent diazo resin solution. After short rubbing the surface seemed to become hydrophilic and the solution was absorbed and dried rapidly to iridescent appearance. Tangible quantities of diazo compound could not be observed on the surface. The relative humidity was 12 percent.

The conditioned sheets were again heated to their respective temperatures, treated with excess solution and passed through a tight wringer several times. The sensitized sheets dried almost immediately and again no diazo compound was visible as a layer on the surface. The surface now showed an even appearance. After exposure the sheets were etched either electrolytically in the zinc chloride bath with a zinc cathode or chemically (without further protection) with 41.5° Be ferric chloride to yield deep engraved images of the original. It was noted that desensitization with Alum-O-Lith desensitizer influenced the electrolytic etching to exposed areas, but had no observable influence on the ferric chloride etching.

The following example describes the practice of this invention with a plate formed of magnesium:

EXAMPLE 25

A magnesium strip from The National Steel and Copper Company of Chicago, Ill., was first cleaned by scouring with rose tripoli and water. The metal was brightened by a very short treatment with 3 percent hydrochloric acid followed by a water rinse. The surface was dried and polished and heated in an oven to 60° C. in preparation for sensitization with diazo compound.

The sheet was sensitized while hot by wiping with a 5 percent diazo resin No. 4, Grade L (Fairmont Chemical Company). The sheet was maintained sufficiently warm so that the water of the applied solution remained only momentarily to avoid the formation of any red decomposition product. The plate, which exhibited a bright yellow surface, was exposed for 9 minutes under a litho original spaced 20 inches away from a 20 ampere, 110-volt arc lamp.

The exposed plate was made the anode in a bath containing 0.5 pound sodium chloride per gallon with a copper cathode for 75 seconds at 0.5 volt and 24 amperes per 100 square inches. The electrolyzed plate was polished with Putz Pomade to reveal etching at the unexposed areas. The exposed imaged areas were high in relief.

EXAMPLE 26

A piece of the same magnesium strip as used in example 25 was sensitized in the manner set forth in that example except that the metal was not initially scoured and brightened. The diazo solution itself when applied as indicated in example 25 was effective to remove the smut and oxides from the metal surface. The sheet was then resensitized by flowing on the diazo resin solution and doctoring with cotton. The quantities of solution used were quite small and the sheet was warmed to effect removal of water before a brown or red color could develop. The yellow plate was stored in the dark for 5 days, then was exposed under a gravure screen for 10 minutes. The screen imaged plate was then exposed under a photo step wedge for 6 minutes.

Next the plate was electrolyzed as anode in a zinc chloride bath (0.5 lb./gal. using a zinc cathode for 20 seconds at 2 volts and 40 amperes per 100 square inches. The etched plate was polished with a pomade, the wells were cleaned with naphtha and their depth was read with a photo engraver's microscope.

The measurements showed etching depth to be dependent on density of the original as shown by the table of the observations:

| Density of Original | Etching Depth (inches) |
|---|---|
| 1.44 | 0.0009 |
| 1.22 | 0.0007 |
| 1.11 | 0.0006 |
| 0.94 | 0.0003 |

EXAMPLE 27

A magnesium plate sensitized as in example 25 was heated in an oven to 70° C., then was exposed 10 minutes under a litho original.

The exposed plate was etched at unexposed areas with ferric chloride of 41.5° Be. The etched areas were black presumably due to deposition of iron. The etching took place within a few seconds and the relief image obtained was estimated to be about 0.002 inch.

When 3 percent hydrochloric acid was used as etchant, the etched areas were bright and light in color.

EXAMPLE 28

Magnesium sheet, cleaned in accordance with the procedure of example 25 was heated to 58° C. on a heavy steel plate, then was sensitized hot by swiping with 5 percent diazo resin No. 4, Grade L, in 1 percent thiourea solution stored for 3 weeks in the cold.

The yellow sensitized plate was exposed 10 minutes under a litho original.

The exposed plate was etched as anode in the magnesium bath described in the foregoing example using a magnesium cathode at 4 volts and 12 amperes per 100 square inches for 1 minute. The etching occurred at exposed areas.

The same exposed plate etched in the zinc chloride bath using a zinc cathode at 2 volts and 12 amperes per 100 square inches for 40 seconds gave etching at the unexposed areas.

The following example illustrates the treatment to sensitize the surface in the presence of a nonoxidizing agent:

EXAMPLE 29

A sheet of lithographic zinc was scoured with rose tripoli and water and then was freed from remaining oxide by washing with a 6 percent solution of hydrochloric acid. The sheet was rinsed with distilled water. One-half the sheet was sensitized by rubbing with a 5 percent solution of diazo resin No. 4, Grade L (Fairmont Chemical Company) and then dried with an infrared lamp. The same treatment was applied to the other half of the plate except that the solution of diazo resin contained 1 percent by weight thiourea. The coatings were applied to provide a gradation between a lightly coated portion and portions of increasing thickness. The sensitized surface treated with the solution in which thiourea was absent remained iridescent but graded to an increasingly tan color at the more heavily sensitized areas. The lightly and heavily sensitized areas treated with solution containing thiourea remained yellow and iridescent.

The plate was exposed for 10 minutes under a litho original at 24 inches from a 115 volt, 22 ampere arc lamp. It was electrolyzed as the anode in a zinc chloride bath (1 pound per gallon) using a zinc plate as the cathode under 2 volts and 3 amps per 100 square inches for 2½ minutes. The plate was dried and polished with Putz Pomade. In the areas sensitized lightly without thiourea and dried quickly before polymerization set in, the etching was strong at the unexposed background providing the image in relief. At the major part of the plate wherein concentration had increased and polymerization took place during longer drying, the etching was strong at the exposed imaged portions while the unexposed portions remained unaffected. The thiourea containing areas, independent of concentration, etched only at the unexposed nonpolymerized portions of the plate.

EXAMPLE 30

This example is addressed to the treatment of the surface by a long immersion to effect the desired stabilization of the diazo coating.

The lithographic zinc, of the type used in the foregoing example, was abraded strongly with a 2 percent diazo resin solution and rose tripoli. The slurry was replaced with a 2 percent diazo resin solution. The sheet was drip drained and then the solution was allowed to reach its own level and dried. When dry, the bottom of the sensitized plate was immersed in a bath of the 2 percent diazo resin for 2 hours and withdrawn and quickly dried.

The first sensitization was carried out under conditions where the sensitization was exposed to oxygen and moisture to induce polymerization. The second sensitization was carried out under conditions where exposure to the combination of moisture and oxygen was substantially eliminated.

The plate was exposed for 6 minutes and part of both areas was rubbed with gum arabic to desensitize and then with Lith-Kem-Ko 2141 to develop the image. Both areas were desensitized and gave strongly bonded developed imaged areas.

The plate was electrolyzed for 3 minutes at 3 volts and 35 amps per 100 square inches as the anode in an electrolytic bath of the type described in the previous example. After electrolyzing, the treated plate was polished to reveal a clear and deep etch. Where protected by litho ink, the etching was at the metal exposed by the desensitizer. The polymerized portion which had not been processed lithographically gave etching in the imaged areas. The nonpolymerized portion, sensitized by imbibition, which had not been processed lithographically, gave etching at the nonimaged areas.

EXAMPLE 31

A sheet of 0.004 inch 1040 cold rolled steel was scoured with a paste of rose tripoli and water, rinsed and then rapidly dried to prevent oxidation which occurs readily when water is present. The sheet was sensitized by rubbing with a 5 percent solution of diazo resin No. 4, Grade L, and doctoring one-half of the sheet with cotton and drying at 50° C. to dry only to the point where the water had visibly evaporated. Use was made of the same diazo solution containing 1 percent thiourea on the other half of the plate. The nonthiourea treated area was tan and iridescent while the area treated with the solution containing thiourea had a bright yellow cast.

The plate was exposed under a litho original for 10 minutes and then was etched for 5 minutes at 2 volts and 4 amps per 100 square inches in the bath described in example 30.

The engraving occurred at the image of the nonthiourea treated area. The engraving was reversed in the part of the plate containing thiourea, i.e. etching had taken place at and through the unexposed areas.

EXAMPLE 32

A sheet of 1010 cold rolled steel was scoured with a mixture of rose tripoli and a solution of 5 percent diazo resin No. 4, Grade L, in 25 percent methanol. The sludge was replaced with diazo solution, the plate was drip drained and then the plate was dried. At the area of heaviest concentration, the polymerization overnight had advanced to a red material. At the more lightly coated areas, as indicated by the yellow color on the surface, polymerization had ceased. The plate was exposed under a litho original for 9 minutes and then it was etched for 8 minutes at 2.5 volts and 2 amps per 100 square inches. The plate was desensitized with Alum-O-Lith desensitizer. The yellow areas desensitized readily to yield a strongly bonded oleophilic image deep etched to an estimated five tentousandths of an inch. The red areas of the plate resisted desensitization and showed no differentiated etching, indicative of the fact that the red areas were not light sensitive.

EXAMPLE 33

A sheet of 0.015 inch half hard brass was polished with rose tripoli and cleaned with 5 percent solution of hydrochloric acid followed by rinsing with water. The surface was sensitized with a solution of 6 grams of diazo resin in 85 cc. of water and 33 cc. of methanol.

The plate was exposed for 20 minutes under a negative. One-half of the exposed plate was etched 2 minutes in a zinc chloride bath (0.5 pound per gallon) at 2 volts and 1.7 amps. The image was deeply etched and oleophilic.

The other half of the exposed plate was etched as an anode in a sodium chloride bath (1 pound per gallon) using a copper cathode for 3 minutes at 2 volts and 1.5 amps. In this instance, etching occurred beneath the unexposed coating and not under the exposed portions of the coating thereby to result in a relief image from the original negative.

EXAMPLE 34

A sheet of stainless steel was cleaned with rose tripoli and then acidified with 5 percent hydrochloric acid solution and rinsed. It was heavily coated with a solution of 6 grams of light-sensitive diazo resin in 85 cc. of water and 33 cc. of methanol and then exposed under a negative suitable for lithographic plate production.

The exposed plate was electrolyzed as the anode at 2 volts and 1.75 amps in a zinc chloride solution with a zinc cathode. The electrolyzed plate was rinsed with alcohol, dried, rubbed with lacquer and desensitized to yield a deep etched oleophilic positive image on a hydrophilic background.

Generally, the upper limit of diazo concentration sufficient for use in the electrolytic deep etch process is determined by practical printing speeds desired, although it is preferred to have the diazo resin present in a continuous film rather than in such high concentrations as to form into a powder upon drying. It is preferred to use coating compositions containing 0.05 to 0.3 gram of diazo resin and more per 100 square inches, although the actual amounts used will depend upon the particular metal used and the end use of the plate.

Generally in the electrolytic etching systems, the counteretching with hydrochloric acid before sensitization with a diazo compound promotes image bonding, especially with zinc. Increased acidity of the etching bath also promotes image bonding and the bonding is somewhat affected also by the time of etch.

On the other hand, by using gum arabic to condition the surface before sensitization with the diazo resin, by decreasing the acidity of the electrolytic bath and by increasing the time of electrolytic etch, conditions are provided which tend to loosen the image bond so that the coating can be removed from these areas and the metal plated either with copper or other oleophilic metal base.

Many of the preceding examples are illustrated by precleaning of the plate with rose tripoli. Other methods may be used and may be preferred for commercial practice. Thus electrolytic or solvent cleaning methods may be employed.

It will be apparent from the foregoing that we have provided a number of new and important concepts in metal printing plate manufacture using photographic techniques whereby improved surface and deep etched lithographic plates or improved gravure plates may be prepared in a simple and efficient manner without the expenditure of time, manpower and materials heretofore required in the preparation of such plates and in which the printing plates prepared in accordance with the practice of this invention are capable of better image reproduction and use in the preparation of many thousands of copies of good quality.

It will be understood that changes may be made in the details of construction, preparation and operation without departing from the spirit of the invention, especially as defined in the following claims.

We claim:

1. The process of providing a presensitized copper alloy printing impressing member suitable for exposing, hardening and then etching to provide recesses in the surface which comprises the steps of: providing a copper alloy body having a smooth flat surface, cleaning the surface and acidifying the surface if necessary to remove any traces of alkalinity present, contacting the surface with a solution of diazo resin substantially for from about 15 minutes to about 5 hours, mechanically treating said surface while thus contacted in a manner suitable for forcing liquid into pores of a porous material, drying the surface and aging the thus treated and coated surface for at least about 30 minutes.

2. A presensitized printing member comprising a base member having a surface formed of a metal selected from the group consisting of copper or an alloy of copper, silver or an alloy of silver, a layer of a light-sensitive diazo resin which has been worked into the surface of the base member and aged to provide a stabilized light-sensitive diazo resin coating on the surface of the base member.

3. A presensitized printing member as claimed in claim 2 in which the base member is a flat sheet of copper.

4. The process of providing a copper alloy printing impressing member having recesses in the surface which comprises the steps of: providing a copper alloy body having a smooth flat surface, cleaning the surface and acidifying the surface if necessary to remove any traces of alkalinity present, immersing the surface in a solution of diazo resin for from 15 minutes to 5 hours, mechanically treating said surface while thus immersed in a manner suitable for forcing liquid into pores of a porous material, drying the surface and aging the thus treated and coated surface for at least 30 minutes, then exposing through a transparency to ultraviolet light, then hardening the layer to set the image and then etching.

5. The process of claim 4 in which said hardening is accomplished by heating at from 150° F. to 175° F. for from 1 minute to 10 minutes and the etching is electrolytic etching.

6. The process of claim 5 in which the bath used for etching consists essentially of a solution of NaCl.

7. The process of claim 4 in which said hardening is accomplished by treating with cupric bromide and is then stopped with sodium ferrocyanide and said etching is provided by applying ferric chloride solutions of various concentrations.

8. The process of providing a presensitized printing member having a printing surface selected from the group consisting of copper and an alloy of copper, silver and an alloy of silver, comprising providing the base member with a smooth, flat surface, cleaning the surface of the base member, contacting the surface with a light-sensitive diazo resin, mechanically treating the surface while in contact with the diazo resin to force the resin into the surface of the base member for direct contact with the metal, drying the treated surface and then aging the thus treated surface of the plate.

9. A presensitized printing member comprising a base member formed of a metal selected from the group consisting of copper, zinc, aluminum, iron, brass, silver, tin, lead, magnesium, stainless steel, chromium, manganese, nickel and alloys thereof, a layer of a light-sensitive diazo resin forming compound which has been worked into the surface of the base member and aged to provide a stabilized light-sensitive diazo resin coating on the surface of the base member.

10. A presensitized printing member comprising a base member formed of a metal selected from the group consisting of copper, zinc, aluminum, iron, brass, silver, tin, lead, magnesium, stainless steel, chromium, manganese, nickel and alloys thereof, a layer of light-sensitive diazo resin forming compound stabilized by reaction with the metal in the surface of the base member which has been rendered nascent while in contact with the diazo resin forming compound.

11. A presensitized printing member comprising a base member formed of a metal selected from the group consisting of copper, zinc, aluminum, iron, brass, silver, tin, lead, magnesium, stainless steel, chromium, manganese, nickel and alloys thereof, a layer of a light-sensitive diazo resin forming compound on the surface of the base member in which the diazo compound is stabilized by reaction with metal made available on the surface of the base member in the nascent state for at least a part of the time while in contact with the diazo resin forming compound.

12. A presensitized printing member as claimed in claim 11 in which the diazo compound of the coating is stabilized by reaction with the metal at the surface of the base member in the substantial absence of oxygen.

13. A presensitized printing member as claimed in claim 11 in which the diazo compound of the coating is stabilized by reaction with the metal at the surface of the base member in the substantial absence of oxygen and water.

14. A presensitized printing member as claimed in claim 11 in which the diazo compound of the coating is stabilized with reaction of the metal at the surface of the base member in the presence of a nonoxidizing atmosphere.

15. A presensitized printing member as claimed in claim 11 in which the diazo compound of the coating is stabilized with reaction of the metal at the surface of the base member in the presence of a nonoxidizing agent.

16. The process of providing a presensitized printing member having a metal printing surface selected from the group consisting of copper, zinc, aluminum, iron, brass, silver, tin, lead, magnesium, stainless steel, chromium, manganese, nickel and alloys thereof comprising providing the base member with a smooth flat surface, cleaning the surface of the base member, contacting the surface with a light-sensitive diazo resin forming compound, mechanically treating the surface while in contact with the diazo compound to force the compound into the surface of the base member for direct contact with the metal, drying the treated surface and then aging the treated surface.

17. The process of providing a presensitized printing member having a printing surface in the form of a metal selected from the group consisting of copper, zinc, aluminum, iron, brass, silver, tin, lead, magnesium, stainless steel, chromium, manganese, nickel and alloys thereof, providing the base member with a smooth flat surface, coating the surface with a light-sensitive diazo resin forming compound under conditions to bring the diazo compound into direct contact with the raw metal to form a stabilized diazotized metal surface and to provide a stable light-sensitive diazo coating on the surface of the printing member in which the surface is mechanically treated while wet with the diazo compound to bring the diazo compound into direct contact with the metal at the surface.

18. The process of providing a presensitized printing member having a printing surface in the form of a metal selected from the group consisting of copper, zinc, aluminum, iron, brass, silver, tin, lead, magnesium, stainless steel, chromium, manganese, nickel and alloys thereof, providing the base member with a smooth flat surface, coating the surface with a light-sensitive diazo resin forming compound under conditions to bring the diazo compound into direct contact with the raw metal to form a stabilized diazotized metal surface and to provide a stable light-sensitive diazo coating on the surface of the printing member in which the coated surface of the printing member is abraded with an abradant inert to the diazo compound while wet with the diazo compound for direct contact with the metal.

19. The process of providing an imaged deep etched photolithographic plate, ready for installation on a printing press, which comprises the steps of cleaning the surface of a metal plate, coating the surface with a water soluble, light-sensitive diazo compound, exposing the plate to light through a transparency and electrolytically etching the exposed plate without prior removal of diazo from the exposed and unexposed portions of the plate to remove metal underlying the diazo compound in those areas which were exposed to light.

20. The process of providing an imaged deep etched photolithographic plate, ready for installation on a printing press, which comprises the steps of cleaning a plate having a surface selected from the group consisting of alloys of zinc, aluminum and magnesium to provide on said plate a surface substantially devoid of grease, coating said surface with a water soluble light-sensitive diazo compound, exposing the plate to ultraviolet light through a transparency, placing the plate in an electrolytic etching bath without prior removal of diazo compound from the exposed and unexposed portions of the plate to remove metal from those areas which were exposed to light, applying desensitizing solution to remove the unchanged light-sensitive coating in the unexposed areas.

21. The process of providing an imaged deep etched photolithographic plate, ready for installation on a printing press, which comprises the steps of cleaning a plate having a surface selected from the group consisting of alloys of zinc, aluminum and magnesium to provide on said plate a surface substantially devoid of grease, coating said surface with a water soluble light-sensitive diazo compound, exposing the plate to ultraviolet light through a transparency, placing the plate in an electrolytic etching bath without prior removal of diazo compound from the exposed and unexposed portions of the plate to remove metal from those areas which were exposed to light, applying developing ink to protect the exposed areas, applying desensitizing solution to remove the unchanged light-sensitive coating in the unexposed areas.

22. The process of providing an imaged deep etched photolithographic plate, ready for installation on a printing press, which comprises the steps of cleaning a plate having a surface selected from the group consisting of alloys of zinc, aluminum and magnesium to provide on said plate a surface substantially devoid of grease, coating said surface with a water soluble light-sensitive diazo compound, exposing the plate to ultraviolet light through a transparency, placing the plate in an electrolytic etching bath without prior removal of diazo compound from the exposed and unexposed portions of the plate to remove metal from those areas which were exposed to light, applying lacquer to protect the exposed areas, applying desensitizing solution to remove the unchanged light-sensitive coating in the unexposed areas.

23. The process for preparation of an imaged deep etched photolithographic plate ready for installation on a printing press which comprises the steps of cleaning a plate having a surface selected from the group consisting of alloys of zinc, aluminum and magnesium to provide a surface substantially devoid of grease, coating said surface with a coating composition comprising a water soluble, light-sensitive diazo compound, exposing the plate to ultraviolet light through a transparency, placing the plate in an electrolytic etching bath without prior removal of the diazo coating from the plate to remove metal from those areas which were exposed to light and continuing the etch for a period of time to remove coating in the exposed areas, inking the printing plate, which is hydrophilic in both the exposed areas which are depressed and unexposed areas which are high, as a dry offset plate.

24. The process of claim 23, further characterized by the additional step of re-exposing the plate to harden the coating in the previously unexposed areas.

25. The process of claim 23, in which in the plate a layer of zinc overlies a copper base and in which the plate is etched for sufficient time to remove the zinc and expose the copper in the exposed areas.

26. The process of providing an imaged deep etched photolithographic plate, ready for installation on a printing press, which comprises the steps of cleaning a plate having a surface of zinc alloy to provide on said plate a surface substantially devoid of grease, coating said surface with a water soluble light-sensitive diazo compound, exposing the plate to ultraviolet light through a transparency, placing the plate in an electrolytic etching bath without prior removal of diazo compound from the exposed and unexposed portions of the plate to remove metal from those areas which were exposed to light.

27. The process of providing an imaged deep etched photolithographic plate, ready for installation on a printing press, which comprises the steps of cleaning a plate having a surface of zinc alloy to provide on said plate a surface substantially devoid of grease, coating said surface with a water soluble light-sensitive diazo compound, exposing the plate to ultraviolet light through a transparency, placing the plate in an electrolytic etching bath without prior removal of diazo compound from the exposed and unexposed portions of the plate to remove metal from those areas which were exposed to light, applying desensitizing solution to remove the unchanged light sensitive coating in the unexposed areas.

28. The process of providing an imaged deep etched photolithographic plate, ready for installation on a printing press, which comprises the steps of cleaning a plate having a surface selected from the group consisting of alloys of zinc, aluminum and magnesium to provide on said plate a surface substantially devoid of grease, coating said surface with a water soluble light-sensitive diazo compound, exposing the plate to ultraviolet light through a transparency, placing the plate in an electrolytic etching bath without prior removal of diazo compound from the exposed and unexposed portions of the plate to remove metal from those areas which were exposed to light, applying developing ink to protect the exposed areas, applying desensitizing solution to remove the unchanged light-sensitive coating in the unexposed areas.

29. The process of providing an imaged deep etched photolithographic plate, ready for installation on a printing press, which comprises the steps of cleaning a plate having a surface of zinc alloy to provide on said plate a surface substantially devoid of grease, coating said surface with a water soluble light-sensitive diazo compound, exposing the plate to ultraviolet light through a transparency, placing the plate in an electrolytic etching bath without prior removal of diazo compound from the exposed and unexposed portions of the plate to remove metal from those areas which were exposed to light, applying lacquer to protect the exposed areas, applying desensitizing solution to remove the unchanged light-sensitive coating in the unexposed areas.

30. The process of providing an imaged deep etched photolithographic plate, ready for installation on a printing press, which comprises the steps of cleaning a plate having a surface of zinc alloy to provide on said plate a surface substantially devoid of grease, coating said surface with a coating comprising a water soluble light-sensitive diazo compound, exposing the plate to ultraviolet light through a transparency, placing the plate in an electrolytic etching bath without prior removal of diazo coating from the exposed portions to remove metal from those areas which were exposed to light and continuing the etch for a period of time to remove the coating in the exposed areas.

31. The process of claim 30, further characterized by the additional step of re-exposing the plate to harden the coating in the previously unexposed areas, applying developing ink to insure that the previously unexposed and subsequently re-exposed areas are oleophilic and inking said areas.

32. The process of claim 30 further characterized by utilizing a plate comprising a layer of zinc deposited on a copper base and etching for sufficient time to remove the zinc and expose the copper in the exposed areas.

33. A process for the preparation of a deep etch photolithographic plate comprising the steps of cleaning the surface of the plate formed of a metal selected from the group consisting of copper, zinc, aluminum, iron, brass, silver, tin, lead, magnesium, stainless steel, chromium, manganese, nickel and alloys thereof, coating the surface of the plate with a water soluble light-sensitive diazo resin forming compound, exposing the coated surface of the plate to light through a transparency, etching the plate without previous removal of the exposed and unexposed diazo compound to produce an etched plate which may subsequently be desensitized, developed and mounted on a printing press for the production of copies.

34. The process as claimed in claim 33 in which the plate is etched by an electrical etch in an electrolytic bath in which the exposed plate is suspended as the anode.

35. The process as claimed in claim 33 in which the plate is etched by a chemical etch.

36. The process as claimed in claim 33 in which the diazo resin in the coating is in a high polymeric insolubilized state and in which the portion of the plate surface that is etched underlies the exposed portions of the coating.

37. The process as claimed in claim 33 which includes the step of plating a film of copper onto the walls of the etched portion of the plate after the diazo coating has been removed.

* * * * *

UNITED STATES PATENT OFFICE
CERTIFICATE OF CORRECTION

Patent No. 3,615,442 Dated October 26, 1971

Inventor(s) Frank T. Geris et al.

It is certified that error appears in the above-identified patent and that said Letters Patent are hereby corrected as shown below:

column 8, line 16, "from" should be "form";
" " line 23, "surface" should be "surfaces";

column 12, line 3, before "light" insert "a";

column 12, line 75, after "81" N.J. should be "cc";

column 23, line 1, "tousandths" should be "thousandths"

Signed and sealed this 2nd day of May 1972.

(SEAL)
Attest:

EDWARD M.FLETCHER,JR.
Attesting Officer

ROBERT GOTTSCHALK
Commissioner of Patents